Patented May 8, 1951

2,552,290

UNITED STATES PATENT OFFICE 2,552,290

PROCESS FOR MAKING OAT CEREAL FLAKE

Edward F. Lilly, Chicago, and Eldor G. Rupp, Clarendon Hills, Ill., assignors to The Quaker Oats Company, Chicago, Ill., a corporation of New Jersey No Drawing. Application January 11, 1946, Serial No. 640,678

3 Claims. (Cl. 99—80)

The present invention relates to an improved form of ready-to-eat cereal of the breakfast food type, and to the process of making the same.

Primarily, the invention deals with the production of a crisp, moisture and water-resistant blistered toasted cereal flake made from cereal flours, as distinguished from flakes hitherto made from either the cereal grains or from cereal grits. The invention has particular application to the production of a palatable oat flake, although the invention is not limited to oat products, but may be employed for the production of flakes from other cereal flours, or mixtures thereof.

The essential principle involved, as will be more fully explained hereinafter, is the production of a specially pressure-cooked and partially dried dough, which, after pelleting and toasting, becomes converted into a blistered, crisp, crunchy and non-slumping flake, which will maintain these properties upon contact with aqueous liquids such as milk or cream.

The products of the present invention are to be distinguished from the prior art cereal flakes in a number of respects, which will become apparent when considering first the usual manner of making cereal flakes, such as corn flakes and the like. Thus in the conventional process of making corn or rice flakes, the procedure is as follows:

The grain or grits are cooked in a rotating cooker into which steam is injected. The cooked grains are then dried from about 33 to about 18 per cent moisture content, after which the partially dried cooked cereal grains are allowed to temper for about 16 to 20 hours to permit equalization of moisture within and between the cereal kernels. The tempered grains are then subjected to a flaking treatment and the resulting flakes are toasted in any suitable manner. Such a process produces satisfactory blistered flakes when applied to corn or rice. When the foregoing procedure, however, is applied to wheat, the resulting flakes are fragile, are not blistered, and lose body rapidly in milk, whereas by the process of this invention the flakes are strong, blistered, and stand up well in milk. Oat flakes produced by the conventional process are not blistered, are mealy, lack crispness and crunchiness, and when placed in milk they rapidly disintegrate to a mush. In other words, such flakes are entirely unsatisfactory and are unsalable.

In addition to the conventional processes for making flakes, using grains as the starting materials, there have been many attempts to cook cereal doughs, using flours as the starting material, and then making flakes from these doughs. We are familiar with the processes described by Greenwood in United States Patent No. 2,011,050; by Lyons in United States Patent No. 2,116,634; by McKay in United States Patent No. 2,339,419; by Scanlon in U. S. Patent No. 1,890,697; and by Proctor in British Patent No. 401,555. However, none of these result in blistered flakes. Where any expansion occurs in this type of product it has been to give a hollow flake. The Scanlon and McKay patents mentioned above teach the art of producing such hollow flakes. None of these above-mentioned patents claim to produce, or will produce, an oat flake having the satisfactory characteristics which characterize our new product.

The primary object of our invention is to produce a good blistered cereal flake which is crisp, tender and crunchy, and retains those qualities to a substantial degree even after being immersed in milk or cream for a matter of several minutes.

Another object of our invention is to provide a cereal product having a good flavor and a delicate friable structure.

By means of the present invention we are able to produce cereal flakes which are not only superior in flavor, crispness, resistance to absorption of moisture and keeping qualities, but also can successfully compete on a price basis with other prepared cereals.

In order that flakes may fulfill the requirements listed above, it is necessary that they be strong, expanded and blistered. By the term "blistered" is meant that condition wherein the otherwise smooth moisture resistant surface is interrupted by frequent elevations enclosing open spaces between the two outer films or surfaces. An expanded flake is one where an increase in thickness has taken place. Blistered flakes are necessarily expanded; however, expanded flakes are not necessarily blistered.

We have now discovered a process of producing satisfactory ready-to-eat blistered cereal flakes which involves changing the physical structure of a cooked dough in such a manner that, upon being subjected to flaking, there will be produced strong flakes having a continuous fused homogeneous form and possessing an impervious film or surface, with the result that, upon toasting, the moisture escaping from these flakes is capable of forming blisters on the flakes without the formation of hollow flakes.

In order to illustrate the present invention, the following examples will be given, it being understood, however, that these examples are not for the purpose of limitation, but rather of illustration. The percentage of the ingredients may be varied within wide limits, and other flavoring ingredients may be added or substituted in whole or in part for those stated. All parts are by weight.

Example I

| | Parts by weight |
|---|---|
| Oat flour | 125 |
| Salt | 5 |
| White cane sugar | 5 |
| Malt syrup | 10 |
| Water | 80 |

The above ingredients may be mixed in any order, but we prefer to place the oat flour in the mixing chamber of a heavy duty, steam-jacketed, pressure and vacuum-equipped dough mixer, to which the water is then added. The flavoring ingredients listed above, or any usual flavoring ingredients such as salt, sugar, sugar syrup, non-diastatic malt syrup, etc., are then added. The mixer is closed and the kneading action is commenced. Steam is turned into the jacket up to 30 pounds pressure. As the dough cooks, pressure builds up in the sealed mixing chamber itself and is maintained, by means of a relief valve, at about 10-12 pounds internal pressure. At the end of the cooking period the internal pressure is released. Since rapid drying is an essential feature of the process, the cooked dough is dried in the shortest time possible to about a 30 per cent moisture content. As a method which is both rapid and convenient we prefer to dry the cooked dough in the dough mixer under vacuum.

After removal of the desired amount of water, the cooked partially dried dough is formed into pellets by being extruded through a die having circular openings which are roughly ⅛ inch in diameter. A knife moving across the face of the die cuts the extruded material into any desired length. The pellets are then immediately subjected to a flaking treatment. Instead of extruding the dough through a die, one may roll the material into a thin sheet between rolls and cut the thin dough into flakes of any desired shape. Repeated extrusion of the dough at this point will prevent the development of blistered flakes. Flakes in the form of stars, circles, squares, diamonds, letters, etc., or combinations of these may be made in this manner. The resulting flakes are then subjected to a blistering, toasting and expanding treatment by heating them by means of air having a temperature of between 450° and 675° F. This may be done in any suitable manner, such as by passing the flakes through a rotary oven or placing the flakes on trays in a toasting oven.

With the above improved process, we are able to obtain oat flakes which are strong and which stretch out into a thin, rubbery, fused structure which is characteristic of corn and rice flakes, but which hitherto it has been impossible to obtain with oat flakes. With this improved process the amount of breakage which occurs during the flaking and toasting operations is actually less than that which occurs in the regular production with the usual process of corn or rice flakes. The toasted oat flakes made by our improved process are well blistered and well expanded. They are crisp and crunchy and stand up well in milk. They possess none of the mealiness which characterizes oat flakes made by former processes. The non-toasted oat flakes may have a thickness of between 0.01 and 0.015 of an inch which increases about 225 per cent on toasting.

The physical treatment which is given the oat dough during the cooking, drying, pelleting and flaking steps is very important and must be controlled. Insufficient treatment gives a flake which will not blister, while too much causes the formation of hollow flakes, which is quite undesirable, as these are either too brittle or tend unduly to float on milk or cream.

An exact time for cooking cannot be stated as the time necessary will vary with the amount of dough cooked. For example, when 225 pounds of dough are placed in a 50 gallon mixer, a cooking period of about 90 minutes is required, but if the amount of dough is reduced to 22.5 pounds and a 5 gallon mixer is used, the cooking time will have to be reduced to approximately 40 minutes.

A certain amount of mixing is necessary in order properly to cook such doughs. In the absence of efficient mixing and kneading the cooking effect does not penetrate a mass of dough to any great extent, but is restricted largely to the surfaces, and the mixing serves to expose new surfaces. In addition, mixing brings about a certain dough development that is required. For example, even if a dough is formed into thin slabs without agitation, and these are then apparently thoroughly cooked, such doughs will fail to yield satisfactory blistered flakes. At best they show only indications of blistering.

It is quite essential, however, that the dough be not overdeveloped because this causes formation of hollow flakes.

We have been able to limit this development to the proper degree by the following means:

(1) Controlling the amount of mixing. This can be done by regulating the speed of the mixing blades or by intermittent mixing.

(2) Cooking with the minimum amount of moisture possible for adequate cooking, so that the subsequent drying that is necessary may be held to a minimum. Cooking in an externally heated sealed cooker is definitely superior to cooking with injected steam because the moisture content can be more carefully controlled.

(3) Vacuum drying of the dough, with sufficient capacity to accomplish the desired moisture reduction in a matter of one or two minutes. This holds to a minimum the physical treatment of the dough during this part of the process.

(4) A minimum of handling in reducing the dough to pellet or flake form.

When oat flour and water are heated, the mixture first turns to a light brown paste which is "short" and crumbly. At this stage the cooked dough can be readily crumbled or broken up into lumps. Upon continuing the pressure cooking, the dough changes to a darker brown color and becomes rubbery instead of crumbly. At this stage the dough does not readily break into lumps. Instead it stretches before breaking. This is the proper condition for the cooked oat flour dough for subsequent flaking and blistering. The practical operator will soon learn to recognize that point during the pressure cooking when the dough has been developed to the state to give the proper physical form and the proper rubbery characteristics suitable for flaking and blistering.

Cooking under pressure likewise seems essential. For example, when the internal pressure is kept at atmospheric by allowing the developed steam to escape, it is impossible to obtain blistered flakes even though the cooking period is extended three or four fold. The development of the dough when cooked in this manner does not appear to improve any further after the first 20 minutes or so.

Best results are obtained by keeping the moisture content of the partially dried dough from the cooker between 28.5 and 31.5 per cent. Low moisture content causes a diminishing of the blistering qualities. A moisture content beyond about 32 per cent causes flaking difficulties when the dough is transferred to the rolls.

In direct contrast to the previously well established cereal flaking processes wherein the cooked grain or grits are usually tempered for a period of about 24 hours before going to the flaking rolls, we have found that with our process, best results are obtained when no tempering takes place.

Example II

A further improvement in the products of the present invention can be attained by the elimination of excess fatty materials from the cereal flour, especially in the case of oats, prior to the formation of the dough. This improvement is claimed in the copending application of Eldor G. Rupp, Serial No. 767,861, filed August 9, 1947.

Specifically, a de-fatted flour gives a flake which has longer shelf life and a better flavor. It seems as if the fat solvent removes certain constituents of the oats which impart a bitter flavor. The dough made from de-fatted oat flour is more rubbery, the flakes can be rolled thinner and still give a good blistered product. In general, flakes made from a de-fatted oat flour are more nearly like corn and rice flakes.

Using de-fatted oat flour as a base ingredient, the following is a typical example:

|  | Parts by weight |
|---|---|
| De-fatted oat flour | 120 |
| Salt | 4 |
| Sugar | 4 |
| Malt syrup | 10 |
| Water | 70 |

The method of mixing the ingredients is the same as described for using whole oat flour (Example I), namely the flour is placed in the mixer, water added and then the flavoring ingredients. We have found, however, that the cooking time is reduced when a de-fatted flour is used. Approximately 90 minutes cooking time was required when the whole flour was used; but when de-fatted flour was used instead, the cooking time was reduced to about 60 minutes.

For removal of the fatty material we prefer a fat solvent such as ethylene dichloride; however, any fat solvent which is reasonably volatile may be used. Other fat solvents which have been used include the volatile hydrocarbons, ethers and acetone. By the term "substantially de-fatted oat flake" we mean one containing less than about one per cent fat.

Example III

As already indicated, other cereal flours may be used, preferably in admixture, to produce the blistered, toasted flakes of the present invention. Thus a flake containing both oat and corn flour may be made as follows:

By substituting a mixture comprising oat and corn flour in the weight ratio of 4 to 1, a flake was obtained similar physically to the flake produced in Example I when the procedure described therein was followed. The corn, of course, imparted a characteristic flavor to the flake.

Other flour mixtures were also used in producing flakes with excellent results both in regard to the appearance of the resulting flake and to its flavor. The other flour mixtures included:

Example IV

|  | Per cent |
|---|---|
| Oat flour | 80 |
| Rice flour | 20 |

Example V

|  | Per cent |
|---|---|
| Wheat flour | 80 |
| Oat flour | 20 |

Example VI

|  | Per cent |
|---|---|
| Oat flour | 80 |
| Corn flour | 20 |

Example VII

|  | Per cent |
|---|---|
| Wheat flour | 100 |

In Examples IV–VII, the procedure was substantially that of Example I, the flavor of the flakes being influenced by the nature of the flour. It is of course understood that the other flavoring ingredients as shown in Example I were employed.

The final thickness (i. e. after toasting) of the flakes, as made in accordance with the hereinabove described process, varies between 0.02 to 0.035 of an inch in thickness, averaging 0.025 of an inch. They are blistered, therefore comparable with corn flakes in that respect, but differ from the latter in being made from a flour instead of from a grit or grain. The present invention therefore places oats and wheat in a competitive position with corn flakes, producing a product similar in appearance to such flakes, as contrasted with the relatively tiny wheat flakes hitherto offered to the public. As already mentioned, direct production of oat flakes (i. e. from the oats as contrasted with flour) has been impossible. The present invention therefore represents a distinct and valuable forward step in the art.

Saving for themselves such equivalents as will occur to those skilled in the art into which this invention falls, applicants claim:

1. A process of making blistered, toasted and friable oat flakes capable of maintaining their tenderness, crispness and crunchiness after being mixed with cold aqueous fluids such as cream or milk which comprises mixing oat flour with water in proportions to form a dough, cooking said dough under pressure with simultaneous kneading until a noncrumbling coherent cooked dough is formed, then partially drying the cooked dough under vacuum, thereafter forming the resulting mass into flakes of a desired thickness, and toasting the flakes at an elevated temperature to produce the blistered product.

2. The process recited in claim 1 wherein the moisture content of the cooked dough is reduced to between about 28.5 and 31.5 per cent in the vacuum drying step and wherein the toasting step is effected at a temperature between about 450° and 650° F.

3. The process recited in claim 1 wherein the partially dried dough is pelleted in a single pelleting operation prior to flaking, and wherein the resulting pellets are flaked without mechanical reworking.

EDWARD F. LILLY.
ELDOR G. RUPP.

REFERENCES CITED

The following references are of record in the file of this patent:

UNITED STATES PATENTS

| Number | Name | Date |
|---|---|---|
| 167,224 | Chiozza | Aug. 31, 1875 |
| 1,321,754 | Kellogg | Nov. 11, 1919 |
| 1,364,634 | Lippen | Jan. 4, 1921 |
| 1,524,051 | Nixon | Jan. 27, 1925 |
| 1,839,928 | Perky | Jan. 5, 1932 |
| 1,890,697 | Scanlon | Dec. 13, 1932 |
| 1,923,684 | Perky | Aug. 22, 1933 |
| 1,946,803 | McKay | Feb. 13, 1934 |
| 2,011,050 | Greenwood | Aug. 13, 1935 |
| 2,071,434 | Sarnmark | Feb. 23, 1937 |
| 2,116,634 | Lyons | May 10, 1938 |
| 2,269,536 | Kellogg | Jan. 13, 1942 |
| 2,295,116 | Kellogg | Sept. 8, 1942 |
| 2,314,282 | Levin | Mar. 16, 1943 |
| 2,339,419 | McKay | Jan. 18, 1944 |
| 2,388,904 | Collatz | Nov. 13, 1945 |